United States Patent [19]

Girguis

[11] Patent Number: 4,582,502
[45] Date of Patent: Apr. 15, 1986

[54] CONSTANT VELOCITY JOINT

[76] Inventor: Sobhy L. Girguis, Magdalenestr. 19, D-5210 Troisdorf-Oberlar, Fed. Rep. of Germany

[21] Appl. No.: 602,091

[22] Filed: Apr. 19, 1984

Related U.S. Application Data

[63] Continuation of Ser. No. 407,160, Aug. 11, 1982, abandoned.

[30] Foreign Application Priority Data

Aug. 29, 1981 [DE] Fed. Rep. of Germany ....... 3134270

[51] Int. Cl.⁴ .............................................. F16D 3/20
[52] U.S. Cl. .................... 464/111; 464/123; 464/905
[58] Field of Search ............... 308/6 R; 464/111, 120, 464/122, 123, 124, 167, 905, 162

[56] References Cited

U.S. PATENT DOCUMENTS

| | | | |
|---|---|---|---|
| 1,586,881 | 6/1926 | Degener | 464/122 X |
| 2,532,754 | 12/1950 | Beck, Sr. | 464/167 |
| 2,722,115 | 11/1955 | Dunn | 464/124 |
| 2,787,144 | 4/1957 | Chauvel | 464/167 |
| 2,910,845 | 11/1959 | Wahlmark | 464/906 X |
| 2,911,805 | 11/1959 | Wildhaber | 464/120 X |
| 2,926,510 | 3/1960 | DeLorean | 464/123 |
| 3,041,858 | 7/1962 | Wildhaber | 464/905 X |
| 3,318,108 | 5/1967 | Cadiou | 464/111 |
| 3,367,142 | 2/1968 | Groves et al. | 464/162 |
| 3,381,497 | 5/1968 | Allen | 464/122 |
| 3,478,541 | 11/1969 | McGill et al. | 308/6 R X |
| 3,596,478 | 8/1971 | Komuzin | 464/111 |
| 3,792,596 | 2/1974 | Orain | 464/123 X |
| 4,224,806 | 9/1980 | Kobayashi | 464/123 X |

FOREIGN PATENT DOCUMENTS

| | | | |
|---|---|---|---|
| 2748044 | 5/1978 | Fed. Rep. of Germany | 464/111 |
| 2831044 | 10/1979 | Fed. Rep. of Germany | 464/111 |
| 1236436 | 6/1960 | France | 464/123 |
| 0054721 | 4/1980 | Japan | 464/111 |
| 18938 | of 1914 | United Kingdom | 464/124 |
| 1252889 | 11/1971 | United Kingdom | 464/123 |

OTHER PUBLICATIONS

Glaenzer Spicer, "Tripod Joints", Jun. 1979.

Primary Examiner—Stuart S. Levy
Assistant Examiner—Daniel P. Stodola
Attorney, Agent, or Firm—Hayes, Davis & Soloway

[57] ABSTRACT

A constant velocity joint comprises in combination a rotatable shaft having three outwardly projecting trunions, each of which carries a roller; a case rotating about and with the shaft and having three inner equally spaced longitudinal grooves aligned with the rollers and allowing longitudinal motion between the rollers and the casing; and an elongate guide interposed between each roller and its corresponding groove, with the guide being affixed to the shaft against relative longitudinal motion between the two, while permitting some tilting of the elongate guide relative to the shaft, and with the guide being free to move longitudinally in the groove of the casing.

13 Claims, 14 Drawing Figures

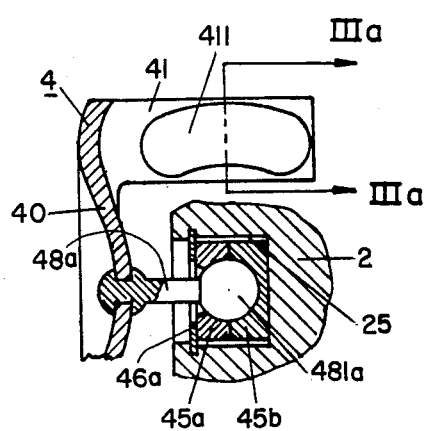
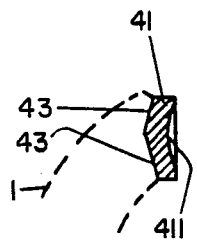
FIG 3a
FIG 3
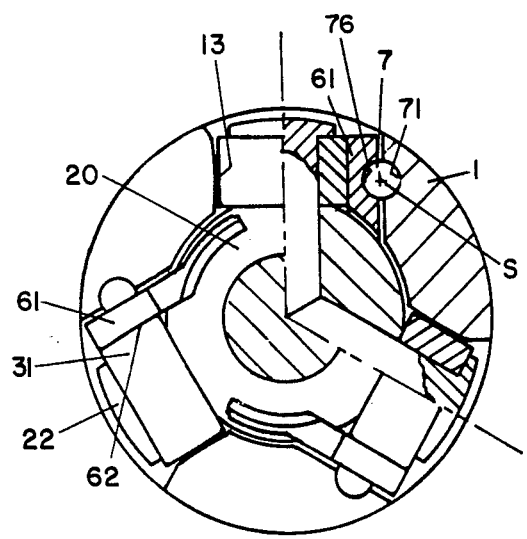
FIG 4

CONSTANT VELOCITY JOINT

This is a continuation of application Ser. No. 407,160 filed Aug. 11, 1982 now abandoned.

INTRODUCTION

The invention relates to a constant velocity joint having (1) a hollow outer component or casing with three longitudinal, equally circumferentially spaced guide grooves distributed over its inner periphery and (2) an inner shaft rotating with the casing located inside the casing and having three outwardly directed arms or trunions, each of which carries a roller located in the guide grooves of the outer component. Constant velocity joints of this construction are for example described in West German patent applications Nos. 27 48 044 and 28 31 044.

In this type of reciprocating constant velocity joint the torque is transmitted directly between the inner shaft and the outer casing by tangential forces between the rollers and the guide groove walls. The longitudinal motion also occurs between the rollers and the guide groove walls. When the joint is articulated, the inner shaft experiences an axial displacement with respect to the outer component, which, upon rotation of the joint, is represented by a circular movement three times the angular velocity of the joint. To balance this kinematic property, the rollers are carried so as to be slidable along the axis of the joint and have a spherical shape (ball rollers), with the guide groove walls exhibiting corresponding concave surfaces running parallel to the axis. As a result of the articulation, the rollers additionally move along their respective arms.

The rollers can alternatively have a cylindrical shape (cylindrical rollers). In this case the guide groove walls must, however, have a mating concave shape parallel to the axis to be able to balance out the eccentricity referred to above. The cylindrical rollers can be carried on their respective arms so as to be fixed in the axial sense.

Independently of what the actual design is, this joint construction always produces a periodic third order axial force which takes the form of an alternating load on the adjoining bearing or mechanical unit. This force depends on the torque, on the angle of articulation and above all on the frictional relationships existing at the torque transfer rollers. When the joint is, for example, used for the front wheel drive of a motor vehicle, a needle bearing is as a general rule provided between the rollers and their arms to minimize rotational friction at this point. Nevertheless, the alternating load acts as a source of vibrations and causes shaking of the engine unit. The shaking is particularly pronounced when the axial forces from the joints on both sides of the differential are additive or when the excitation frequency is close to the natural frequency of vibration of the motor unit—especially when the vehicle is being sharply accelerated from a standstill where the high torque value and the angle of articulation resulting from the raising of the front end of the vehicle reach extreme values. These problems mean that the practical application of post constant velocity joint constructions was limited to relatively small angles of articulation.

The present invention provides a constant velocity joint of the construction described above in which a periodic axial alternating force does not appear or is significantly reduced in one direction of rotation, and where the joint is robust, compact and reliable.

To achieve this aim, this invention interposes between the rollers and the guide groove walls in at least one direction of rotation, strip-like or elongate guides for direct transmission of the tangential forces. The strip-like members are fixed against longitudinal movement with respect to the inner shaft but are displaceable longitudinally along the axis of the outer component or casing.

In accordance with the invention, the periodic axial forces are taken up by the elongate guides, or, stated on other terms, are balanced out within the joint. Since the axial forces are essentially dependent upon frictional values, they amount to a fraction of the main force so that the elongate guides can be dimensioned with this aim in mind. One is not dealing here with an intermediate part which has the task of transmitting the torque as such.

Since the extent of the frictional forces now no longer plays the decisive role in the design of the joint, it will as a general rule be possible to dispense with providing a rolling bearing arrangement between the roller and its arm or trunion. This increases the reliability of the joint and leads to a reduction in the cost and the number of parts constituting it.

A further advantage of this arrangement consists in the fact that the main functions of the joint, namely articulation and reciprocation or plunging, are separated. The actual articulation operation takes place between the inner component and the elongate guides, whilst the reciprocating function is performed between the elongate guides and the outer component. As a result of this, each function is individually optimized without taking the other function into account. For example, fixed reciprocating travel stops of simple construction can be provided between the elongate guides and the outer component of fixed articulation stops can be provided between the inner component and the elongate guides, as a reuslt of which both the safety and reliability of the joint are significantly improved.

Provision is made in one embodiment of the invention when the design of joint employs spherical rollers for the elongate guides to be fixed against axial displacement by a common base arranged centrally with respect to the inner shaft and attached thereto.

When this is done, it can further be provided for ease of manufacture, for the elongate guides to be formed in one piece with the base and to be joined together in the form of a cage.

The attachment of the cage can take the form of a ball joint so that the articulation of the cage/shaft joint is not impeded. The ball joint can consist of a pin with a spherical head which is tiltably mounted between two half shells located in a passage or hole in the end of the inner shaft.

Play can be provided between the pin and the base to accommodate wobbling of the shaft. Alternatively, play can be provided between the half shells and the peripheral wall of the passage in the inner shaft. With spherical rollers, a track of circular shape in cross section can be provided on the elongate guide on the side facing a spherical roller to accommodate shaft wobbling.

As another alternative the tracks for the spherical rollers provided in the elongate guides can be cylindrical and run parallel to the main axis. As a result, the elongate guides can be designed to have a constant cross section, with a consequent saving in manufacturing costs.

As a further alternative, the tracks for the spherical rollers in axial section can follow a curved path. This is possible as a result of the separation of the articulation and reciprocating functions of the joint. The shape of the curved path can be as desired. For example, a curved path can be selected which substantially corresponds to the radial movement of the rollers so that the displacement of the respective rollers on their trunions and consequently the friction wear can be reduced to a minimum.

When cylindrical rollers are used, the side of the elongate guide facing the cylindrical roller can provide a planar, and on the side facing the guide groove wall a circular contour can be provided. This arrangement has the advantage that the cylindrical rollers run on flat planar surfaces which, in contradistinction to known constructions, can be provided with a higher degree of conformity of line contact. As a result, the force transmitting capacity and the working life of the joint are significantly improved. The relatively inexpensive cylindrical rollers can be fixed against axial movement on their respective arms.

In accordance with this invention, it can be provided further for the inner shaft to have an enlarged spherical head or ending supporting the roller arms and for each elongate guide to have inwardly-extending arms or forks with concave guiding surfaces mating with the shape of the spherically head to hold the elongate guide against longitudinal motion relative to the shaft. Thus, the periodic axial force on each roller is directly taken up and balanced using a relatively simple part.

A further embodiment of a constant velocity joint employing cylindrical rollers in accordance with the invention provides for the side of the elongate guide facing the cylindrical roller to be flat, whilst the side of the elongate guide facing the guide groove wall is provided with a guide running parallel to the longitudinal axis having a circular contour, and in which the elongate guides are tiltably joined with a common base, around the axis of rotation of their circular profile, the base being centrally affixed to the inner shaft. This embodiment is particularly suitable for joints which require a large angle of articulation.

The independent arrangement for reciprocating motion of the joint permits relative motion between the elongate guides and the guide groove wall. In a further embodiment of this invention, provision is made for the contours of the guide groove walls and the elongate guides to match each other. When cylindrical rollers are used, the cross section between the two should be circular. A slippery plastic coating between the elongate guide and the guide groove significantly reduces the resistance. The plastic coating will also give a damping action in the motion between the two and will extend their service life.

When a cage having the elongate guides is used, the cage can have a full end wall extending over the end of the inner shaft. This will permit a separation of the lubrication and sealing functions. The cage can be very stable.

In another embodiment a roller bearing can be placed between each of the elongate guides and the guide groove walls. This embodiment is particularly suitable where the lowest possible resistance to the reciprocating action is required.

The rolling path of the roller bearing over the elongate guides can be limited to a relatively short distance so that part of the longitudinal path of travel can take place with rolling contact and the remainder with sliding contact. This can be achieved by providing for the rolling path of the roller bearing over the elongate guides to be limited using stops or by using a differing rolling radii on the guide and the groove.

In the case of a joint employing cylindrical rollers, the roller bearing can have a circular contour in a cross section view of the joint, i.e., balls or barrel-shaped rollers are used. The guide groove wall will match the circular contour, e.g., in the sense of a self-aligning ball bearing arrangement.

THE DRAWINGS

The invention will now be described, by way of example, with reference to the accompanying drawings, in which:

FIG. 3 is a fragmentary longitudinal cross-sectional view of a cage for a joint using spherical rollers and curved tracks;

FIG. 3a is a view of the elongate guide in accordance with line IIIa—IIIa in FIG. 3;

FIG. 4 is a partial cross-sectional view of a joint having cylindrical rollers, three forked members providing the elongate guides and ball bearings for one direction of rotation;

DESCRIPTION

Figure 1:
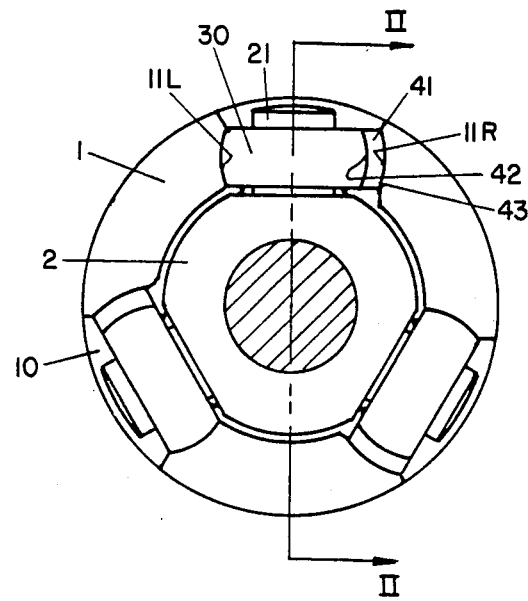
FIG. 1 is a partial cross-sectional axial view of a joint having spherical rollers and elongate guides in the form of a cage for one direction of rotation.

An outer component or casing 1 of a joint shown in FIG. 1 is provided with three guide grooves 10 which have concave walls 11R and 11L. An inner component or shaft 2 has three outwardly directed arms or trunions 21 on which ball rollers 30 are mounted so as to be axially moveable thereon. Between the rollers 30 and the guide groove wall 11R, elongate guides 41 are provided. The inner surfaces 42 and the outer surfaces 43 respectively of guides 41 are adapted to the shape of the ball rollers 30 and the guide groove walls 11R. The elongate guides 41 are fixed against movement along the axis of the inner component 2 but slide longitudinally back and forth on the guide groove walls 11R of the outer component 1. In one direction of rotation, the tangential force between the rollers 30 is transferred, via the elongate guides 41, to the outer component 1. In the other direction of rotation, this transfer occurs directly without the interposition of elongate guides. This embodiment is suitable for the drive mechanisms of motor vehicles. The elongate guides are employed in the forwards torque direction. In reverse gear, the disadvantages of the periodic axial forces described above do in fact occur, but when this is related to the small distances traveled in reverse gear and the torque values involved, these forces do not require special accommodation. In those applications where righthand and lefthand loadings are of significance, two elongate guides per ball roller are provided. The cross section of the mating surface 43/11R, between the elongate guide 41 and the outer component 1 can have any desired form—it does not have to be circular in cross-section.

Figure 2:
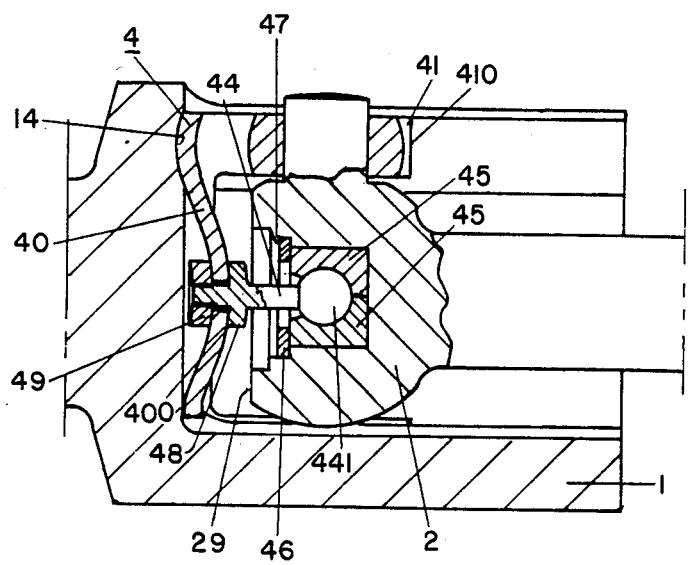
FIG. 2 is a section through the joint in FIG. 1 in accordance with line II—II.

FIG. 2 shows how the elongate guides 41 can be connected to the inner component 2. A base 40 is provided to which the elongate guides 41 are commonly joined, thus forming a cage. The base 40 of the cage 4 can be provided, together with the three elongate guides 41, in a one-piece construction. The base 40 and consequently, the elongate guides 41 are attached to the inner shaft 2 using a ball joint arrangement 400 consisting of pin 44 having a spherical head 441, two half shells 45, disc 46 and stamping 47 as well as flange 48 and nut 49. The inner shaft can bend about the spherical head 441. Also, fastener 400 can move radially slightly on base 40 to balance out the kinematic shift of the joint or other possible inaccuracies. Instead of the play between the pin 44 and the base 40 it is possible to use for this purpose—as shown in FIG. 3—a corresponding amount of play between the half shells 45a and 45b and the opening 25 in the inner shaft.

The planar surface 29 (FIG. 2) of the inner shaft 2 acts as an angular abutment against the base 40 which has a wave-like shape. The joint is shown at the inner plunging stop, with the cage 4 in contact with the guide groove base 14. In contradistinction to known constructions, this abutment does not bring about any chattering noises and no jolting loading on the ball roller should the joint come into this position when it is running in the articulated state. The abutment or stop arrangement is consequently secure and is additionally able to carry loads, so that the reciprocating path of travel of the outer component can be designed to be smaller than in the case of known constructions.

The same applies to the outer abutment or end stop. The planar surface 410 of the elongate guide 41 can act as an abutment surface for a counter-surface which can be introduced onto the outer component, such as a locking ring, a screw or a sheet metal housing.

In FIG. 3 a cage 4 similar to that shown in FIG. 2 is illustrated but with the difference that the tracks 411 (for the ball rollers 30) have a curved path to minimize the axial movement of the rollers on their trunions. Additionally, attaching pin 48a is solidly riveted onto the base of the cage 40. The spherical head 481a is retained between two discs 45a and 45b which are held against movement along the axis in the passage 25 of the inner component 2 by means of a locking ring 46a. Discs 45 can, however, move radially.

FIG. 3a corresponds to section IIIa—IIIa through the elongate guide 41 in FIG. 3. The inner surface 411 has a circular contour corresponding to the contour of the ball roller, while the outer surface 43 has a ridged cross-section. The outer component 1 is shown in dashed lines. Since only general displacement is involved between the elongate guides 41 and the outer component 1, outer surface 43 can basically be shaped as desired, the only requirement being that the outer component 1 would need to be suitable matched to this surface.

The joint in FIG. 4 has three cylindrical rollers 31 carried on the three arms 22 and fixed against up and down movement thereon. The three arms 22 are fastened in a spherical head 20 on shaft 2. In one direction of rotation, an elongate guide taking the form of a forked member 61 is provided for each cylindrical roller, which transmits the torque in one direction of rotation via balls 7 from the inner shaft to the outer component or casing. The surfaces 62 of the elongate guides 61 facing the rollers have a flat surface, and as a result of this a high degree of conformity is achieved between the cylindrical rollers 31 and the elongate guides 61. A very slight crowning or end surface shaping of the cylindrical rollers 31 can be used to optimize the surface pressure. This slight crowning can be provided equally as well on the flat surfaces 62. Between the elongate guides 61 and the outer component 1, balls 7 fit into respective grooves 76 and 71. The balls are able to roll along the grooves 76 over a certain predetermined path of travel, so that in this region the sliding forces in the joint are extremely small. In the other direction of torque, the guide groove walls 13 have a crowned configuration. This embodiment is useful for motor vehicles in which the main loading on the crowned guide groove walls 13 takes place when the vehicle is in reverse gear.

Figure 4A:
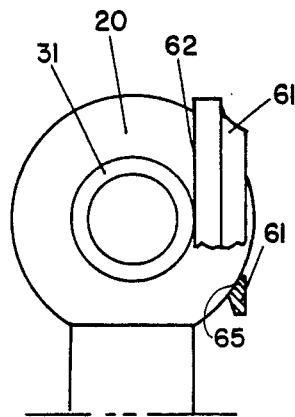
FIG. 4a is a fragmentary view of a forked member from FIG. 4.
Figure 4B:
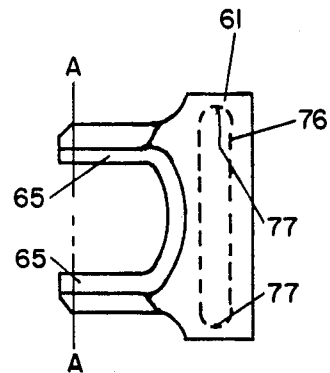
FIG. 4b is a side view of the forked member from FIG. 4.

FIG. 4a clarifies the manner of fixing the forked member 61 to the spherical inner component 20. The forked member 61 in FIG. 4b is shown viewed from the roller side. The surfaces 65 on the ends of the arms of the fork are concave and mate with the surface of sphere 20 and, when the joint is in the straight position, are concentric with the axes of rotation of the cylindrical rollers 31.

The spherical inner component 20 is in contact with the respective forked member 61 on the surfaces 65, which are the inner sides of the fork, along the main axis of rotation A—A in the straight position of the joint. The forked member 61 is, as a result of this, always fixed in the axial sense with respect to the inner shaft 2. The eccentric movement of the inner shaft with respect to the outer component, because of the kinematics of the joint, is balanced out by means of a sliding movement and a tilting movement. Initially, each cylindrical roller 31 can slide on the plane surface 62 facing it in the axial direction of the cylindrical surface 65. Additionally, a tilting movement between firstly, the spherical inner component 20, the cylindrical roller 31 and the forked member 61 and, secondly, the outer component 1 about the ball 7 is also possible (see FIG. 4). The axis S containing the midpoint of the balls is consequently the axis of tilting. The rolling path of the balls 7 in the groove 76 (FIG. 4b) is limited by stops 77.

Figure 4C:
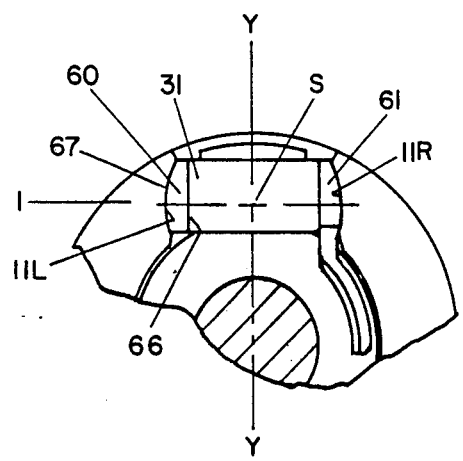
FIG. 4c is a fragmentary view of a joint similar to FIG. 4, but employing slip guiding.

The joint shown in FIG. 4c corresponds, from the kinematic point of view, to the joint in FIG. 4. The forked member 61 slides on the concave guide groove wall 11R of the outer component 1, the axis of tilting of which, S, crosses the axis Y-Y of the rollers 31 at an angle of articulation of the joint of 0°. As a result of this, the tilting movement is minimized, which permits better running. A tilting elongate guide 60 is also provided between cylindrical roller 31 and guide groove wall 11L. This elongate guide has the purpose of optimizing conformity both with respect to the cylindrical roller 31 as well as with respect to the outer component 1, so that the inner surface 66 is flat and the outer surface 67 is cylindrical. The axis of tilting of this elongate guide is also at S, so that this elongate guide 60 can be rigidly fixed to the forked member 61 or, respectively, can be formed from one piece, e.g., one having U-shaped cross section. Alternatively, the elongate guide 60 can be independent.

Figures 5, 5A:
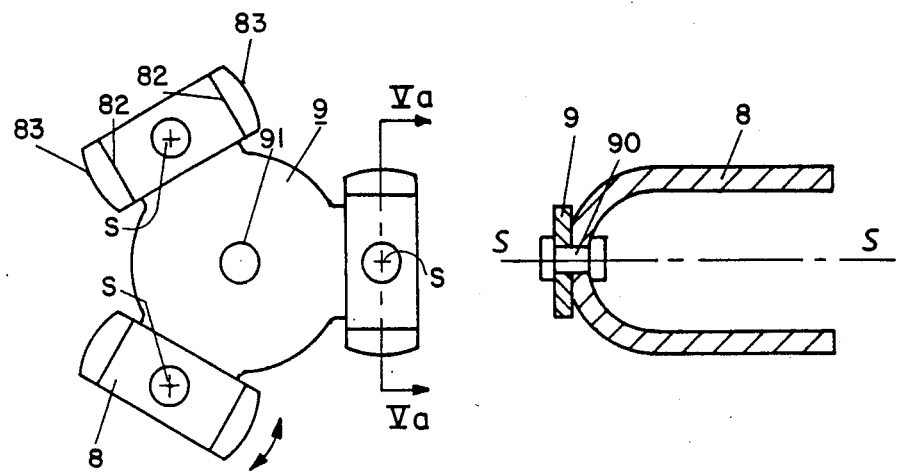
FIG. 5 is a cage for a joint having cylindrical rollers and tiltable elongate guides.
FIG. 5a is a partial view through the cage in FIG. 5 in accordance with line Va—Va.

FIGS. 5 and 5a show a further embodiment of the joint. A parallel pair of elongate guides 8, which in longitudinal section are U-shaped, are tiltably fixed on base 9 by means of rotating pins 90. The axes of the pins, S (FIG. 8), or S—S (FIG. 5a), respectively, are consequently both the axes of tilting as well as the axes of the cylindrical outer surfaces 83 of the elongate guides 8. The inner surfaces 82 are flat. To provide for axial attachment of the base 9 to the inner shaft (not shown), bore 91 is provided.

Figures 6, 6A:
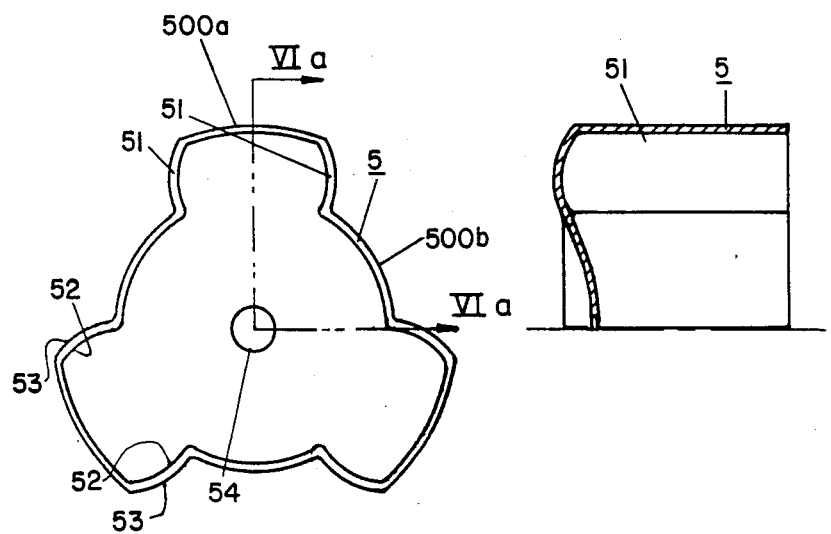
FIG. 6 is a closed cage or cup for a joint employing ball rollers.
FIG. 6a is a fragmentary view through the cage in FIG. 6 in accordance with line VIa—VIa.

In FIGS. 6 and 6a the cage 5, formed from the elongate guides 51 and the base, has a closed box structure and is manufactured from a thin material. The elongate guides 51 are, with inner and outer surfaces 52 and 53, axially cylindrical and are suitable for transmission of torque using ball rollers. Cage 5 is a closed structure or cup up to the forward open end face. As a result, a stiffening is achieved through the provision of the continuous intermediate pieces 500a and 500b. A relatively thin deep drawn component can be used for the cage. A central bore 54 provides for attachment to the inner shaft. The particular feature of this embodiment consists in the fact that the articulating and plunging functions can be spatially and hermetically separated, so that lubrication and sealing of the joint can be kept separate.

Figure 7A:
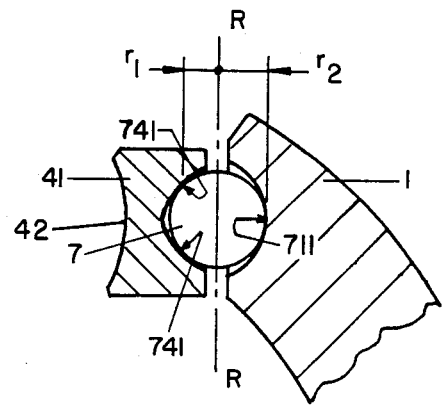
FIG. 7a is a fragmentary cross-sectional view of an elongate guide having a ball bearing in a joint having ball rollers.

FIG. 7a shows elongate guides 41 and an outer casing 1, between which balls 7 provide a linear rolling guide arrangement. R–R is the axis of rolling. The inner surface 42 of the elongate guide 41 is concave and matches that of a corresponding spherical roller. The points of contact 711 and 741 of the ball 7 are so selected on the outer component 1 and on the elongate guide 41, that the radius of rolling $r_1$ is smaller than radius $r_2$. As a result of this, the path of rolling over the elongate guide 41 is smaller than that on the outer component 1. This provision has the effect of providing a stop.

Figure 7B:
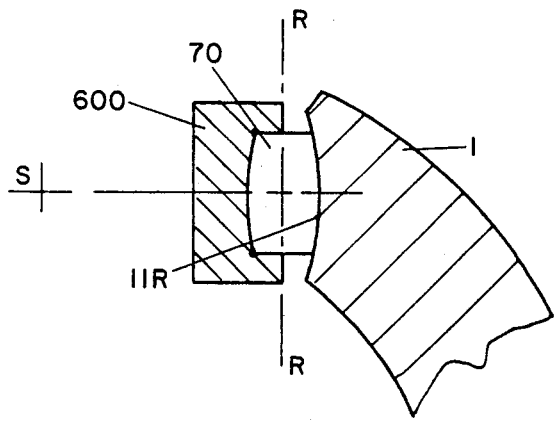
FIG. 7b is a fragmentary view of a cylindrical roller bearing and guide in a joint having cylindrical rollers.

In FIG. 7b a further linear rolling guiding arrangement is shown employing barrel-shaped rollers 70 and an axis of rolling R-R which is suitable for use in joints employing cylindrical rollers. The rollers 70 are guided on all sides in the elongate guide 600, so that no tilting movement therebetween is possible. The contour of the roller 70 corresponds to that of the concave surface 11R of the outer component 1 having S as its center, so that the elongate guide 600, with the roller 70, is able to tilt with respect to the outer component 1 about S.

Although the description and claims herein refer to three trunions and associated structure, it will be understood that the Invention encompasses arrangements in which three or more such trunions and associated structure are utilized and that the claims shall be so construed.

I claim:

1. A constant velocity joint comprising, in combination:
   (a) a rotatable shaft having (i) three outwardly projecting trunnions equally spaced thereabout the axes of which are perpendicular to the axis of the shaft, said axes meeting at a joint center, and (ii) a roller carried by each said trunnion and rotating thereabout;
   (b) a casing rotatable with said shaft and having three inner equally radially spaced longitudinal grooves aligned with said rollers;
   (c) an elongated guide interposed between each said roller and the corresponding groove wall, each said guide being circumferentially on the same side of each roller to accommodate rotation in one direction of said shaft, and
   (d) means affixing said guides to one another and to said joint center against relative longitudinal motion therebetween, said means permitting angular motion of said axis of said shaft around said joint center relative to said guides, each said guide providing a track for said roller allowing said roller to reciprocate relative to said track as a result of the angular rotation of the joint, each said guide mating with said corresponding groove wall allowing longitudinal motion between said guides together with said means and said shaft relative to said casing.

2. A constant velocity joint comprising, in combination:
   (a) a rotatable shaft having (i) three outwardly projecting trunnions equally spaced thereabout the axes of which are perpendicular to the axis of the shaft, said axes meeting at a joint center and (ii) a spherical roller carried by each said trunnion and rotating thereabout;
   (b) a casing rotatable with said shaft and having three inner equally radially spaced longitudinal grooves aligned with said rollers
   (c) an elongate guide interposed between each said roller and the corresponding groove wall, each said guide being circumferentially on the same side of each roller to accommodate rotation in one direction of said shaft, and
   (d) means affixing said guides to one another and to said joint center against relative longitudinal motion therebetween, said means permitting angular motion of said axis of said shaft around said joint center relative to said guides, each said guide providing a track of circular cross section matching said spherical roller and allowing said roller to reciprocate relative to said track as a result of the angular rotation of the joint, said track extending essentially parallel to the axis of said casing, each said guide mating with said corresponding groove wall allowing longitudinal motion between said guides together with said means and said shaft relative to said casing.

3. A constant velocity joint comprising, in combination:
   a. a rotatable shaft having (i) three outwardly projecting trunions equally spaced thereabout the axes of which are perpendicular to the axis of shaft and (ii) a roller carried by each said trunion and rotating thereabout;
   b. a casing rotatable with said shaft and having three inner equally radially spaced longitudinal grooves aligned with said rollers and allowing longitudinal motion therebetween;
   c. an elongate guide interposed between each said roller and the corresponding groove, each said guide being circumferentially on the same side of each groove to accommodate rotation in one direction of said shaft; and d. means affixing each guide to said shaft against relative longitudinal motion between the two while allowing the guide to move longitudinally in the groove therefor in said casing, said elongate guides are supported on a common base extending about said shaft, said common base being a cup member encompassing the end of said shaft and affixed to but tiltable thereabout, there being two of said elongate guides for each said roller formed in the wall of said cup.

4. A constant velocity joint comprising, in combination:
   a. a rotatable shaft having (i) three outwardly projecting trunions equally spaced thereabout the axes of which are perpendicular to the axis of shaft and (ii) a roller carried by each said trunion and rotating thereabout;
   b. a casing rotatable with said shaft and having three inner equally radially spaced longitudinal grooves aligned with said rollers and allowing longitudinal motion therebetween;
   c. an elongate guide interposed between each said roller and the corresponding groove, each said guide being circumferentially on the same side of each groove to accommodate rotation in one direction of said shaft; and
   d. means affixing each guide to said shaft against relative longitudinal motion between the two while allowing the guide to move longitudinally in the groove therefor in said casing, said elongate guides being supported on a common base extending about said shaft, said trunions being placed near an end of said shaft and said common base being a cage extending over said end, said cage being centrally affixed to said end of said shaft by a ball joint, the socket thereof being in said shaft and the ball being the end of the pin attached to said cage, said ball and socket permitting tilting motion of said cage relative to the axis of said shaft but not longitudinal motion relative thereto.

5. The constant velocity joint of claim 4 wherein there is play between said pin and cage.

6. The constant velocity joint of claim 4 wherein said socket is composed of an insert loosely set in a mating hole in said end of the shaft with there being some radial play between said insert and the hole.

7. A constant velocity joint comprising, in combination:
   (a) a rotatable shaft having (i) three outwardly projecting trunnions equally spaced thereabout the axes of which are perpendicular to the axis of the shaft, said axes meeting at a joint center, (ii) an essentially cylindrical roller carried by each said trunnion and rotating thereabout;
   (b) a casing rotatable with said shaft and having three inner equally radially spaced longitudinal grooves aligned with said rollers;
   (c) an elongate guide interposed between each said roller and the corresponding groove wall, each said guide being circumferentially on the same side of each roller to accommodate rotation in one direction of said shaft,
   means affixing said guides to one another and to said joint center against relative longitudinal motion therebetween, said means permitting angular motion of said axis of said shaft around said joint center relative to said guides, each said guide providing an essentially flat surface facing said roller and allowing said roller to reciprocate relative to said guide as a result of the angular rotation of the joint, each said guide mating with said corresponding groove wall allowing longitudinal motion between said guides together with said means and said shaft relative to said casing and whereby at least one of the mating surfaces between said guide and said groove wall being of generally round cross section enabling said guide together with said roller to swivel around an axis essentially parallel to said main axis of said casing for compensation of the weaving motion of the joint, said shaft having a sphere attached to it substantially concentric with said joint center, said guides having two inwardly extending legs having intersurfaces mating with said sphere.

8. A constant velocity joint comprising, in combination:
   a. a rotatable shaft having (i) three outwardly projecting trunnions equally spaced thereabout the axes of which are perpendicular to the axis of the shaft and (ii) a cylindrical roller carried by each said trunnion and rotating thereabout;
   b. a casing rotatable with said shaft and having three inner equally radially spaced longitudinal grooves aligned with said rollers, and
   c. an elongate guide interposed between each said roller and the corresponding groove wall, each said guide being circumferentially on the same side of each roller to accommodate rotation in one direction of said shaft, each said guide providing an essentially flat surface facing said roller and allowing said roller to reciprocate relative to said guide as a result of the angular rotation of the joint as well as a result of longitudinal motion between said shaft relative to said casing, each said guide mating with said corresponding groove wall whereby at least one of the mating surfaces between said guide and said groove wall being of generally round cross section enabling said guide together with said roller to swivel around an axis essentially parallel to the axis of said casing for compensation of the weaving motion of the joint.

9. A constant velocity joint according to claim 8 wherein one of the mating surfaces between said guide and said groove is coated with plastic material of low coefficient of friction, thus reducing the plunging resistance of said joint, as well as the swivel resistance of said guide relative to said groove in case of said cylindrical rollers, moreover damping the torque transmission through said joint.

10. A constant velocity joint comprising, in combination:
   a. a rotatable shaft having (i) three outwardly projecting trunnions equally spaced thereabout the axes of which are perpendicular to the axis of the shaft, said axes meeting at a joint center, and (ii) a cylindrical roller carried by each said trunnion and rotating thereabout;
   b. a casing rotatable with said shaft and having three inner equally radially spaced longitudinal grooves aligned with said rollers;
   c. an elongate guide interposed between each said roller and the corresponding groove wall, each said guide being circumferentially on the same side of each roller to accommodate rotation in one direction of said shaft, means affixing said guides to one another and to said joint center against relative longitudinal motion therebetween, said means permitting angular motion of said axis of said shaft around said joint center relative to said guides, each said guide providing an esentially flat surface facing said roller and allowing said roller to reciprocate relative to said guide as a result of the angular rotation of the joint, each said guide mating with said corresponding groove wall allowing longitudinal motion between said guides together with said means and said shaft relative to said casing and whereby at least one of the mating surfaces between said guide and said groove wall being of generally round cross section enabling said guide together with said roller to swivel around an axis essentially parallel to the axis of said casing for compensation of the weaving motion of the joint, rolling elements being interposed between said guide and said groove allowing for said longitudinal and said swivel motions.

11. A constant velocity joint comprising, in combination:
  a. a rotatable shaft having (i) three outwardly projecting trunnions equally spaced thereabout the axes of which are perpendicular to the axis of the shaft, said axes meeting at a joint center and (ii) an essentially cylindrical roller carried by each said trunnion and rotating thereabout;
  (b) a casing rotatable with said shaft and having three inner equally radially spaced longitudinal grooves aligned with said rollers,
  (c) An elongate guide interposed between each said roller and the corresponding groove wall, each said guide being circumferentially on the same side of each roller to accommodate rotation in one direction of said shaft,
  (d) means affixing said guides to one another and to said joint center against relative longitudinal motion therebetween, said means permitting angular motion of said axis of said shaft around said joint center relative to said guides, each said guide providing an essentially flat surface facing said roller and allowing said roller to reciprocate relative to said guide as a result of the angular rotation of the joint, each said guide mating with said corresponding groove wall allowing longitudinal motion between said guides together with said means and said shaft relative to said casing and whereby at least one of the mating surfaces between said guide and said groove wall being of generally round cross section enabling said guide together with said roller to swivel around an axis essentially parallel to the axis of said casing for compensation of the weaving motion of the joint, said guides being provided as parallel pairs, each pair being supported on a common base at a common point adapted to permit swivel motion of said pair relative to said base, said base being affixed to said joint center by a ball joint, the socket thereof being concentric to said joint center and the ball being the end of the pin attached to said base.

12. A constant velocity joint comprising, in combination:
  a. a rotatable shaft having (i) three outwardly projecting trunnions equally spaced thereabout the axes of which are perpendicular to the axis of the shaft, said axes meeting at a joint center and (ii) an essentially cylindrical roller carried by each said trunnion and rotating thereabout;
  b. a casing rotatable with said shaft and having three inner equally radially spaced longitudinal grooves aligned with said rollers,
  c. an elongate guide interposed between each said roller and the corresponding groove wall, each said guide being circumferentially on the same side of each roller to accommodate rotation in one direction of said shaft,
  d. means affixing said guides to one another and to said joint center against relative longitudinal motion therebetween, said means permitting angular motion of said axis of said shaft around said joint center relative to said guides, each said guide providing an essentially flat surface facing said roller and allowing said roller to reciprocate relative to said guide as a result of the angular rotation of the joint, each said guide mating with said corresponding groove wall allowing longitudinal motion between said guides together with said means and said shaft relative to said casing and whereby at least one of the mating surfaces between said guide and said groove wall being of generally round cross section enabling said guide together with said roller to swivel around an axis essentially parallel to the axis of said casing for compensation of the weaving motion of the joint, one of said mating surfaces between said guide and said groove being coated with plastic material reducing the frictional resistance of said longitudinal and said swivel motions.

13. A constant velocity joint comprising, in combination:
  a rotatable shaft having (i) three outwardly projecting trunnions equally spaced thereabout the axes of which are perpendicular to the axis of the shaft, said axes meeting at a joint center and (ii) an essentially cylindrical rolller carried by each said trunnion and rotating thereabout;
  b. a casing rotatable with said shaft and having three inner equally radially spaced longitudinal grooves aligned with said rollers,
  c. an elongate guide interposed between each said roller and the corresponding groove wall, each said guide being circumferentially on the same side of each roller to accommodate rotation in one direction of said shaft,
  d. means affixing said guides to one another and to said joint center against relative longitudinal motion therebetween, said means permitting angular motion of said axis of said shaft around said joint center relative to said guides, each said guide providing an essentially flat surface facing said roller and allowing said roller to reciprocate relative to said guide as a result of the angular rotation of the joint, each said guide mating with said corresponding groove wall allowing longitudinal motion between said guides together with said means and said shaft relative to said casing and whereby at least one of the mating surfaces between said guide and said groove wall being of generally round cross section enabling said guide together with said roller to swivel around an axis essentially parallel to the axis of said casing for compensation of the weaving motion of the joint.

* * * * *